United States Patent

[11] 3,586,309

| [72] | Inventor | Ladislav Freibauer<br>Prague, Czechoslovakia |
|---|---|---|
| [21] | Appl. No | 788,706 |
| [22] | Filed | Jan. 3, 1969 |
| [45] | Patented | June 22, 1971 |
| [73] | Assignee | Vyzkummy ustav kolejovych vozidel<br>Praha, Czechoslovakia |
| [32] | Priority | Feb. 8, 1968 |
| [33] | | Czechoslovakia |
| [31] | | PV955-68 |

[54] UNSTABLE DAMPENER
5 Claims, 6 Drawing Figs.

[52] U.S. Cl.................................... 267/136,
 105/197, 105/200, 267/134
[51] Int. Cl...................................... F16f 3/00,
 F16f 13/00, F16f 15/02
[50] Field of Search........................... 105/197,
 197 A, 197 B, 197 D, 199, 200; 267/134, 136

[56] References Cited
UNITED STATES PATENTS

| 2,516,072 | 7/1950 | Piron | 105/197 X (D) |
| 3,005,629 | 10/1961 | Williams | 105/197 X (D) |
| 3,397,652 | 8/1968 | Cardwell | 105/197 X |
| 3,407,752 | 10/1968 | Wallace et al | 105/197 (A) |

*Primary Examiner*—Arthur L. La Point
*Assistant Examiner*—Howard Beltran
*Attorney*—Arthur O. Klein ABSTRACT: A suspension device having a labile characteristic and suited for connection in parallel with a spring group having a stable characteristic so as to achieve a soft characteristic. At least one planar mechanism includes two supporting members and an interposed strut. A pair of mutual sprung parts respectively carry these supporting members and guide them in the direction of the springing motion. The axis of the strut in the neutral position of the mechanism extends perpendicular to the direction of springing motion, and its position during spring action is inclined in one or the other direction from the neutral position. A group of springs urges the supporting members toward the strut. This group of springs develops precompression in a direction perpendicular to the springing direction.

PATENTED JUN22 1971

INVENTOR:
Ladislav FREIBAUER
BY
Arthur O. Klein
ATTORNEY

UNSTABLE DAMPENER

BACKGROUND OF THE INVENTION

This invention relates to a suspension device with a labile characteristic, designed e.g. for being associated in parallel with an unstable spring group having a stable e.g. linear characteristic to attain a soft final characteristic of mutual suspension of two parts, especially two vehicle parts.

Advantages of soft suspension are well known. It can be said approximately that with a given oscillating motion of one part, e.g. a vehicle wheel, characterized by a large acceleration, a smaller acceleration of the oscillations in the second part, e.g. a vehicle body, connected with the first part by means of the suspension, provides a softer mutual suspension of the two parts. For suspension purposes springs, i.e. solid bodies made of steel, rubber or other material, are used. Furthermore, gas bags are well suited for this purpose. Horizontal suspension is provided by swing suspension devices.

Both springs and gas bags are deformed by the action of external forces and enable considerable changes in the relative position of two parts connected by the suspension. The characteristic of the suspension element or the whole suspension system shows the dependence of the action of forces on the displacement with the relative position of the sprung bodies undergoing a change in the direction and sense of this action. The rigidity of the suspension element or system is given by the ratio of forces increase to displacement increase.

Suspension elements used for this purpose have a stable characteristic and their rigidity is positive. For a suspension having a small rigidity—i.e. a soft suspension—the springs formed by solid bodies are too bulky and the swing suspension devices are very long. Therefore, it is difficult to use the suspension in the connection of two parts, e.g. vehicle parts. The suspension device itself is heavy and expensive. Springs formed by solid bodies are subject to considerable deformation in case of a large change of the base load, e.g. when loading or unloading the vehicle, and the suspension softness has to be limited so that the change of the relative position of two sprung parts is kept within limits given by the requirements of the design, e.g. the vertical suspension rigidity of a rail vehicle is limited by the largest permissible difference of coupler heights.

Suspension by means of gas bags can be made very soft and the relative position of the parts connected by this kind of suspension can be kept within given limits by introducing and discharging the compressed air. This kind of suspension requires, however, for its functioning a source of compressed gas, an extra source of energy, and a soft suspension requires bulky gas reservoirs. By connection in series or in parallel the suspension elements of positive rigidity no suspension with negative rigidity can be made. In some special cases such suspension could be desirable, e.g. in the connection of the bogie truck frame and body of a vehicle during the relative pivoting thereof about a vertical axis.

SUMMARY OF THE INVENTION

A primary object of the invention is to achieve a soft suspension with stable characteristic of any rigidity or suspension with a labile characteristic.

Thus, it is an object of the invention to use in the suspension system a suspension device with labile characteristic, especially when associated in parallel with a spring group having a stable characteristic.

A suspension device with a labile characteristic according to the invention has one or more structural elements associated in parallel.

BRIEF DESCRIPTION OF THE DRAWINGS

In the accompanying drawings the suspension device with labile characteristic according to the present invention is illustrated, wherein.

DESCRIPTION OF PREFERRED EMBODIMENTS

Reference will now be made to a suspension device with one structural element, illustrated in FIG. 1. The structural element of said suspension device is a planar mechanism constituted by two supporting members 1, 2 and an interposed strut 3. The two supporting members 1, 2 are respectively carried in the direction of springing motion by a pair of mutually sprung parts 10, 20, e.g. by a vehicle part. The axis of the strut 3, in the neutral position of the planar mechanism, is disposed in the direction $x$, perpendicular to the direction of springing motion $y$. The position of this axis is deviated during the spring action, in one or the other direction from the neutral position.

The supporting members 1, 2 are forced against the strut 3 by a group of springs 5, 6 which develop precompression in the direction $x$ perpendicular to the direction of springing motion $y$. The precompression developed by the group of springs 5, 6 are indicated by P, while reactions offered by the strut 3 to the supporting members 1,2 are indicated by S. Of their two mutually perpendicular components, the components X are parallel to the direction $z$, the magnitude thereof being equal to precompression P, whereas the components Y are parallel to the direction $y$. With mutual movement of sprung parts 10, 20 in the direction of springing motion $y$ from the relative neutral position, corresponding with the neutral position of the planar mechanism, the corresponding supporting members 1, 2 are moved together with the sprung parts 10, 20 in the direction $y$. The axis of the strut 3 deviates from its neutral position, wherein it assumes the direction $x$. Reactions of the strut 3 acquire the direction oblique to the direction $x$, and the components Y of reaction S impel the supporting members 1, 2 and the sprung parts 10, 20 from their mutual neutral position, in the direction $y$. The suspension device acts accordingly as a spring with a labile characteristic and negative rigidity.

Figure 3:
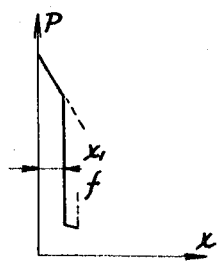
FIG. 3 is a somewhat similar diagram showing the pressure conditions of the strut element in a direction perpendicular to the cushioning direction.
Figure 4:
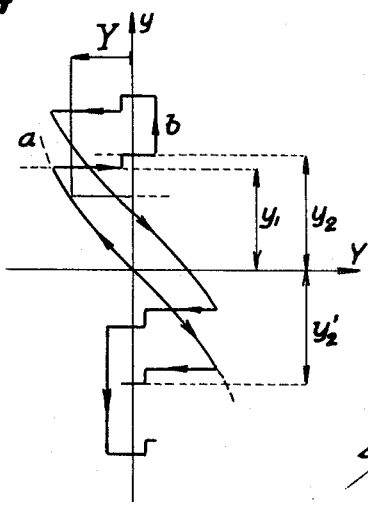
FIG. 4 is a graph showing the spring characteristic of the resilient suspension device itself.
Figure 5:
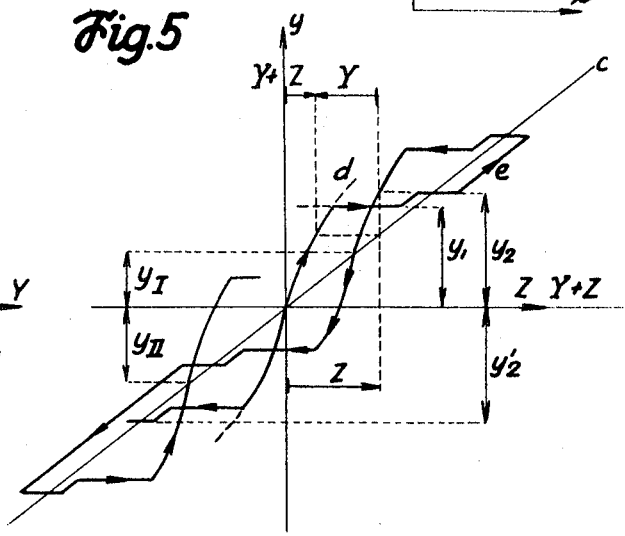
FIG. 5 is a graph showing the spring characteristic of a system comprising a resilient suspension device associated in parallel with a spring group.

FIG. 4 shows the characteristic $a$ of the suspension device with the characteristic $f$ (see FIG. 3) of the springs 5, 6 showing the dependency of precompression drop upon the mutual approach of the supporting members 1, 2 in the direction $x$ resulting from the finite length of the strut 3. By connecting the structural element of the suspension device having a labile characteristic in parallel with a spring group of the suspension not shown in the drawing, loaded by a force Z or the increment thereof which has stable characteristic shown in FIG. 5 by a straight line $c$, a suspension system is achieved with a final stable characteristic (see curve $d$ in FIG. 5) the rigidity of which is smaller than that of the spring group.

The above-mentioned suspension arrangement with a suspension device having a labile characteristic solves the problem of a suspension with unlimited softness. The softness of the suspension, however, remains limited in the cases where the limit of mutual extreme positions of the sprung parts during extreme static loads on the suspension has been determined, e.g. in the horizontal suspension of a fully loaded and completely unloaded vehicle. The suspension device according to the present invention eliminates this drawback, as shown in FIG. 1. Stops 16 are fixed to one of the mutually sprung parts, indicated at 10. The supporting member 2 carried during the spring action by the second of the mutually sprung parts 20, or a jaw 21 fixed to the supporting member 2, are arranged in adjustable alignment to the second sprung part 20 in the direction of springing motion y with the aim of changing the relative position of the supporting member 2 and the second sprung part 20 after a certain travel $y_2$ or $y'_2$ of one supporting member relative to the other from their central position in the direction y in one or another direction of movement after the supporting member 2, or the jaw 21 fixed thereto, have come into contact with one of the stops 16 located on the sprung part 10.

The connection of the supporting member 2, or of the jaw 21, and the corresponding sprung part 20 is provided by friction or with notches and is capable of transmitting the mutual reaction with an inclination towards the direction x larger than the inclination of the axis of the strut 3 during the contact of the supporting member 2, or the jaw 21, with the stop 16. During the displacement a larger resistance to the movement has to be surpassed than the component Y of the reaction S of the strut 3 at the moment when the stop 16 is in contact with the supporting member 2, or with the jaw 21. To attain a small resistance during the displacement there is an advantage in an arrangement of the suspension device according to the present invention wherein the precompression dependence of the precompression developing group of springs 5, 6 on the mutual movement of supporting members 1, 2, in the direction x of precompression, is characterized by a substantial decrease in precompression during the mutual movement $x_1$ to which complies the travel $y_1$ of one supporting member relative to the other from the central position in the direction y just before the contact of the stop 16 with the supporting member 2, or the jaw 21. In the arrangement according to FIG. 1 this is achieved by a stop 17 which limits the travel of the spring 5 in the spring group 5, 6. Stop 17 absorbs part of precompression forces developed by the springs 5.

FIG. 4 shows the characteristic (line b) for the suspension device described above, and the characteristic (line e) in FIG. 5 applies to a system composed of this suspension device and a spring group in parallel therewith, having a linear and stable characteristic expressed by the line 3. On the lines b and e the loading and unloading of the suspension are marked by means of arrows. The movements $y_I$, $y_{II}$ comply with the new neutral positions of the planar mechanism in case of a base load change of the suspension. The dependence of the spring group 5, 6 precompression on mutual approach of the supporting members 1, 2 is shown in FIG. 3 by the line f.

Figure 1:
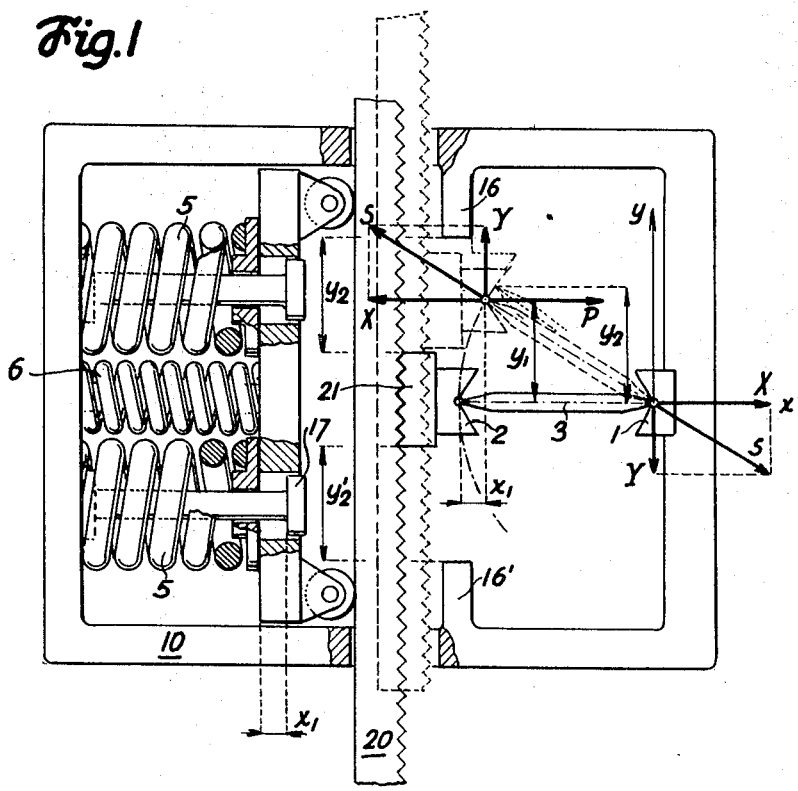
FIG. 1 is a schematic view partially in elevation and partially in section of a resilient suspension system with an unstable spring characteristic.
Figure 2:
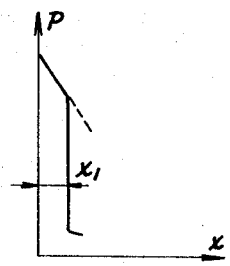
FIG. 2 is a diagram showing the spring characteristic of a spring group of the resilient suspension device.

In the schematic illustration of the suspension device according to FIG. 1 the strut 3 meets the supporting members 1, 2 at their fulcrums. In a real embodiment considerable wear would appear in the place where the supporting members 1, 2 and the strut 3 contact each other and the life of the suspension device would be short. It is evident that an ideal mechanism shown in the schematic illustration may be replaced by another mechanism equivalent from the kinematic point of view. According to one feature of the present invention the strut 3 has the form of a cylinder and the supporting members 1, 2 are cylindrical and have convex contact surfaces, the contact lines of the cylindrical surfaces of the strut and the supporting members being axial and parallel to one another. Thus, the strut 3 rolls on the supporting members 1, 2. This arrangement is resistant to wear at the surfaces of contact of the supporting members 1, 2 with the strut 3. In the case where the cylindrical surfaces of the supporting members 1, 2 are symmetrical to each other with respect to the axis of the cylinder of the strut 3, the mutual reactions of the strut 3 and the supporting members 1, 2 are always perpendicular to cylindrical surfaces of the strut 3 and of the supporting members 1, 2 and, accordingly, they have no component tangential to these surfaces, requiring during the roll motion adhesion of the strut 3 and the supporting members 1, 2.

Figure 6:
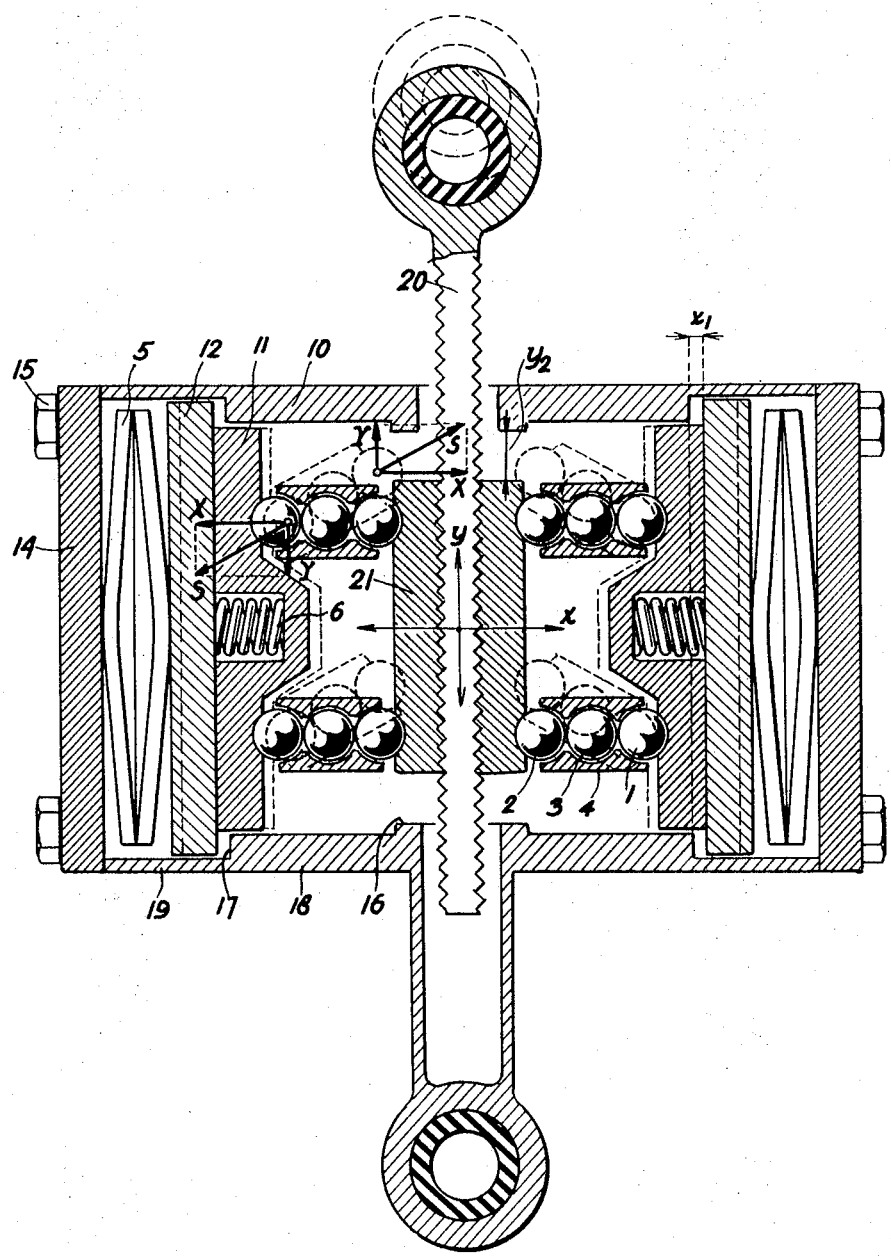
FIG. 6 is a view in vertical section of one embodiment of an application of the resilient suspension system with unstable characteristic.

Another arrangement of planar mechanisms in the unstable suspension device according to the present invention, which can be of considerable advantage, is the embodiment shown in FIG. 6. Here two pairs of planar mechanisms are arranged symmetrically with respect to the plane of symmetry, which is parallel to the direction of springing motion y and perpendicular to the direction of precompression x. The planar mechanisms have supporting members 1 more distant from the symmetry plane which are carried in the direction of springing motion y by the sprung part 10 and supporting members 2 situated nearer to the symmetry plane which are carried in the said direction y by the second sprung part 20. In the specific example according to FIG. 6 the first sprung part is represented a housing 10 and the second one by a bar 20, both parts being connected to other parts, e.g. to parts of a vehicle, by joints.

Both the supporting members 1, 2 and the struts 3 are small cylinders of equal diameter, the strut 3 being guided with respect to the supporting members 1, 2 by a cage 4. The outer supporting members 1 are supported in cylindrical seats of a plate 11, supported in the direction x by a thrust plate 12. Plates 11 and 12 are guided by the housing 10. Between the plate 12 and the cover 14 of the housing 10 the leaf springs 5 are bolted in position by bolts 15 which apply to each of the supporting members 1 in both pairs of planar mechanisms an equalized precompression P, in the direction x perpendicular to the direction of springing motion y. The inner supporting members 2 of both pairs of structural elements are supported by the seats of the jaws 21, connected rigidly in at least a certain part of the suspension device travel from the neutral position with the bar 20.

The arrangement according to the example in FIG. 6 can be adapted for displacement of the neutral position. To this end the contact surfaces of the bar 20 and the jaws 21 are provided with notches which prevent the jaws 21 from gliding along the bar 20, even if the inclination of the reaction S of the strut 3 is at its maximum, until during the travel $y_2$ or $y'_2$ from the neutral position in the direction of springing motion y in one or another direction of movement the stops 16 affixed to the housing 10 strike against the jaws 21 and move them together with the supporting members 2 along the bar 20 after having surpassed the resistance.

In this embodiment a resistance reduction may be attained so that the thrust plate 12, approaching during the movement of the supporting member 2 from its neutral position relative to the supporting member 1 towards the supporting member 2 in the direction x, strikes after the movement $x_1$ in the direction x against the stops 17 disposed on the housing 10 before the jaw 21 strikes against the stop 16 located on the housing 10. During a further movement of the supporting member 1 towards the supporting member 2 in the direction x the whole precompression of the springs 5 is taken by the stops 17, and the precompression of the structural elements is then provided by only a relatively small force of an auxiliary spring 6 forcing the plate 11 away from the plate 12.

Although my invention has been illustrated and described with reference to the preferred embodiments thereof, I wish to have it understood that it is in no way limited to the details of such embodiments but is capable of numerous modifications within the scope of the appended claims.

What I claim is:

1. A resilient suspension system with unstable characteristic, suitable for being associated in parallel with a spring group which has a stable linear characteristic, to attain a resulting soft cushioning between two parts, comprising at least one strut element, at least two supporting members interposing the strut element between the two cushioned parts, means guiding at least one of these supporting members in a direction perpendicular to the direction of cushioning, whereby in the central position of both cushioned parts, corresponding to the basic static load of the cushioned parts, the axis of the strut element is substantially perpendicular to the direction of cushioning with a spring force acting in the direction of the axis of the strut element, a first one of the supporting members being adapted to be taken along by the first cushioned part in the direction of cushioning, a second one of the supporting members being adapted to be taken along in the direction of cushioning by the second cushioned part, the relative position of the second supporting member being adjustable with respect to the second cushioned part, stops on the first cushioned part causing a change of the relative position of the second supporting member with respect to the second cushioned part in the cushioning direction after striking said stops, and means for generating a resistance to changes of the position of the second supporting member with respect to the second cushioned part.

2. A resilient suspension system as claimed in claim 1, wherein the spring force which acts on the strut element in a direction substantially perpendicular to the cushioning direction is substantially reduced prior to the striking by the second supporting member of the stops on the first cushioned part.

3. A resilient suspension system as claimed in claim 2, wherein the spring group comprises a number of spring means acting in parallel, and a part of said spring means is provided with limiting means which eliminate their spring force after a predetermined extension.

4. A resilient suspension system as claimed in claim 1, wherein the strut element is composed of a cylindrical body with an axis perpendicular to the strut element, the strut element rests on cylindrical surfaces of both supporting members with parallel generating lines of the cylindrical body and of said cylindrical surfaces, and comprising means for maintaining the alignment of the cylindrical body with respect to the centers of said cylindrical surfaces.

5. A resilient suspension system as claimed in claim 1, comprising strut elements arranged symmetrically with respect to a plane of symetry parallel to the cushioning direction and perpendicular to the spring force which acts on said strut elements, the supporting members which are distant from the plane of symmetry being carried along by the first cushioned part, and the supporting members which are nearer to such plane of symmetry being carried along by the second cushioned part.